United States Patent [19]
Hale et al.

[11] Patent Number: 5,355,414
[45] Date of Patent: Oct. 11, 1994

[54] COMPUTER SECURITY SYSTEM

[75] Inventors: Robert P. Hale; Jason T. Kurashige, both of Irvine, Calif.

[73] Assignee: AST Research, Inc., Irvine, Calif.

[21] Appl. No.: 7,170

[22] Filed: Jan. 21, 1993

[51] Int. Cl.⁵ .......................... H04L 9/32; G06F 13/12
[52] U.S. Cl. .......................................... 380/25; 380/4; 364/709.05; 364/DIG. 1; 364/DIG. 2; 364/234.2; 364/928.2
[58] Field of Search ................. 380/4, 25; 364/709.05, 364/234, 234.2, 928, 928.2

[56] References Cited

U.S. PATENT DOCUMENTS
4,942,606  7/1990  Kaiser et al. ............................ 380/4
5,173,940  12/1992 Lantz et al. .......................... 380/4 X

OTHER PUBLICATIONS
Intel 80C51SL-AG Keyboard Controller product data, Sep. 1990.

*Primary Examiner*—Gilberto Barrón, Jr.
*Attorney, Agent, or Firm*—Knobbe, Martens, Olson & Bear

[57] ABSTRACT

A computer security device for preventing unauthorized access to a computer system automatically disables peripheral device access to the computer system after the peripheral input devices remain inactive for a predetermined period. The system comprises a host computer which is in communication with a keyboard controller and a display. The keyboard controller is in communication with one or more peripheral input devices such as a keyboard and a mouse. The computer security device operates in the keyboard controller, independent from the host. The keyboard controller activates security after a preset time period during which the mouse and keyboard remain inactive. When the security is active, the keyboard controller disables transfers to the host computer from the peripheral input devices. In order to re-enable peripheral device access to the host computer, a user enters a correct password on the keyboard. In a preferred embodiment, the display is also deactivated when security is active. Thus, if the user leaves a computer station, any information which was displayed on the screen is not viewable.

18 Claims, 7 Drawing Sheets

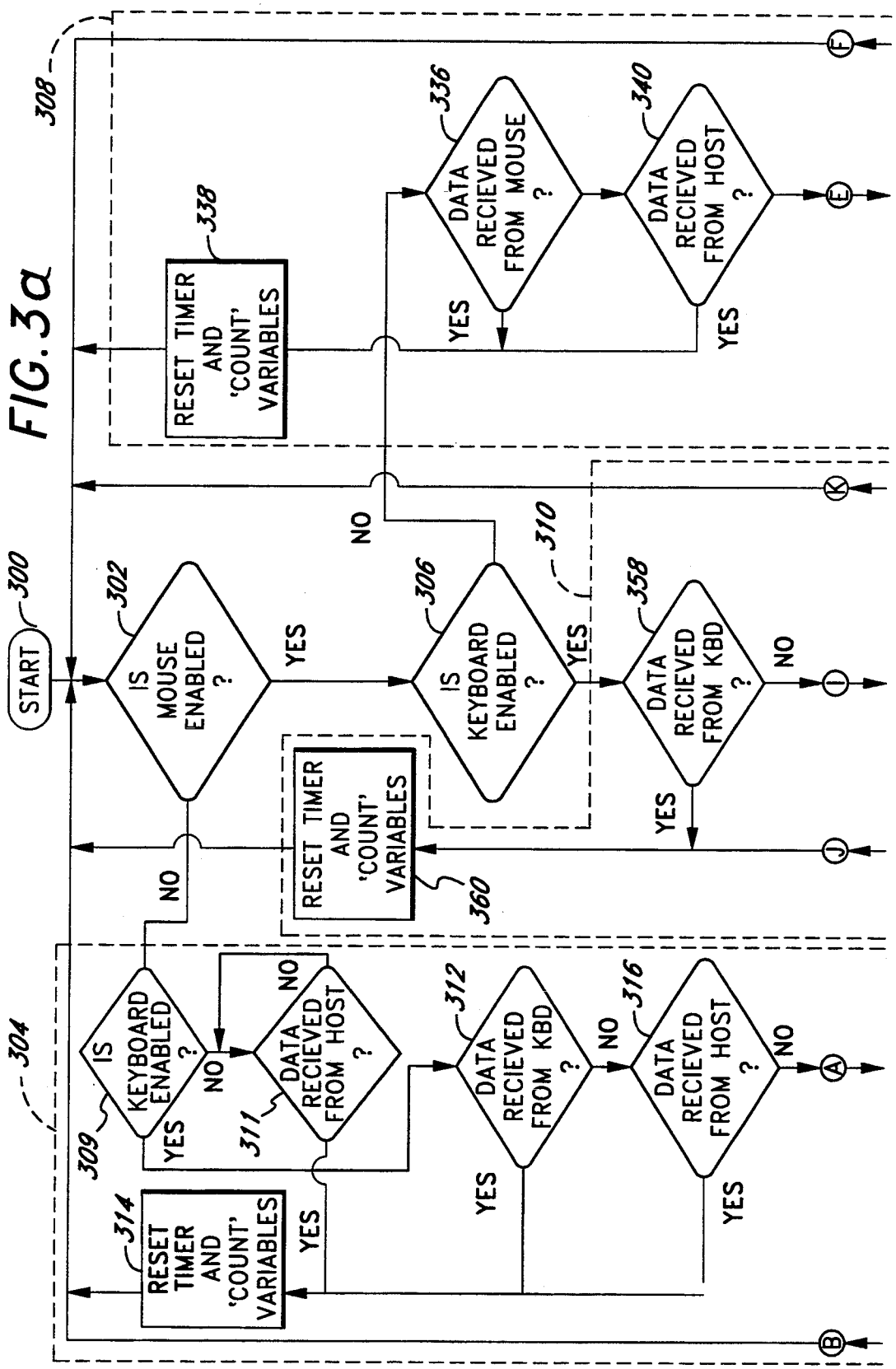

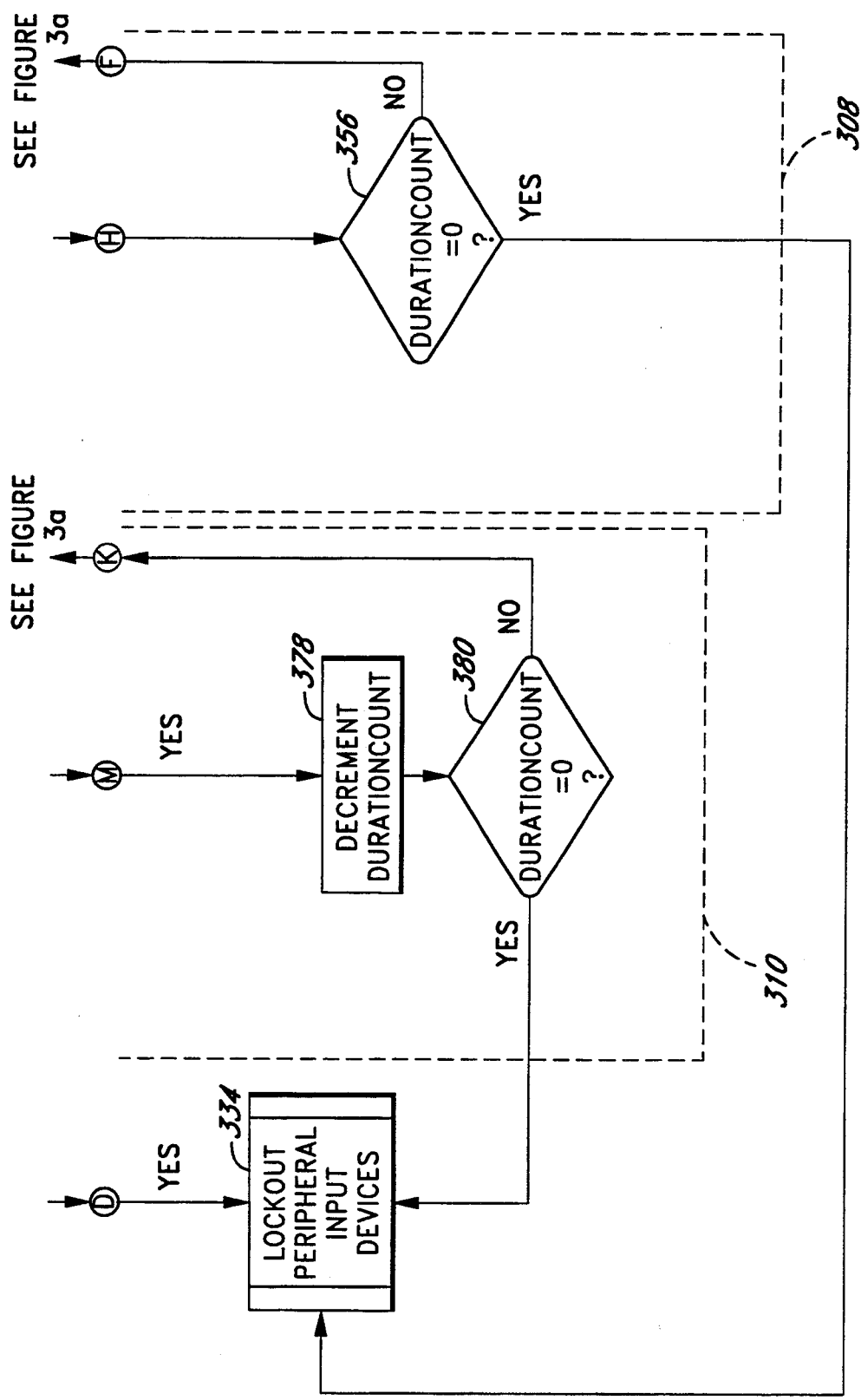

COMPUTER SECURITY SYSTEM

BACKGROUND OF THE INVENTION

1. Field of the Invention

The present invention relates to computer security systems used to prevent unauthorized access to the computer's operating system by peripheral input devices such as a keyboard or mouse via the keyboard controller.

2. Description of the Related Art

Security systems of various kinds are well known in the art for computer systems and computer related applications. These security systems have been designed to safeguard sensitive information which may be stored or processed within computer systems and to prevent unauthorized access to the computer's operating system. The desirability for computer security systems has increased significantly over recent years with the proliferation of personal and business computer systems and with the storage of increasingly valuable and/or classified information within these computer systems. Additionally, computer viruses have become more prevalent, increasing the need to prevent unauthorized access to the operating system of the computer.

In computer systems such as the PC and AT compatible systems, little or no security was initially provided. Security needs are now given higher priority. Thus, computer systems such as the PS/2 were designed to incorporate security features. For example, in one prior computer security system, a user enters a password during boot operations in order to gain access to information within the computer system. In another previous computer security system, a user is able to lock the keyboard through a designated series of keystrokes. The user can then regain access to the computer system by entering the correct password on the keyboard. In yet another computer security system, the keyboard automatically locks after the keyboard remains inactive over a preset interval. After the keyboard locks, when a key is pressed, the user is prompted to enter a password. Once the user enters a correct password, the keyboard becomes fully active, and operation of the computer system begins where it stopped. These security systems are generally operated by the host operating system.

The demand for increased computer security has become even more urgent with the advent of computer viruses which can enter a computer system by a variety of different channels. Many viruses are even capable of entering a computer system and disabling the security system. This poses a significant problem with terminate-and-stay-resident (TSR) computer security systems operating in the host computer. Because the operating system (OS) executes TSR programs, a virus which enters the OS from the hard drive, a modem or other input device could easily disable these security systems. An unauthorized user could then obtain access to the computer. Furthermore, since this type of security system is contained solely in software, users could potentially access this software and disable the security system without the proper password. Thus, a need exists for a computer security system that provides a safeguard against unauthorized access to the operating by means of the keyboard or mouse or otherwise and that is less susceptible to computer by viruses or other tampering.

SUMMARY OF THE INVENTION

The present invention involves an improved security system for computers which utilizes a keyboard controller as an interface between the host computer and the keyboard and other peripheral input devices. The security system of the present invention operates in the keyboard controller, rather than in the host computer as a TSR program. During operation of the security system, the user can activate the security measures with a predetermined keystroke sequence. In addition, the keyboard controller monitors the activity of the keyboard and a mouse, if these devices are enabled, and activates the security measures after a preset interval during which the keyboard and the mouse (if both are enabled), the keyboard (if only the keyboard is enabled), or the mouse (if only the mouse is enabled), remain inactive. Thus, if the user walks away from the computer, the security system will automatically activate the security measures after a preset interval of inactivity.

The security measures generally involve the keyboard controller preventing transfer of any data to the host computer from the peripheral input devices connected to the keyboard controller. In other words, while security is active, the keyboard controller does not allow any transfers to the host computer via the keyboard controller.

In order to again access the host computer, a correct password is entered on the keyboard. A correct password is the only input from the keyboard to which the keyboard controller will respond. Once the correct password is entered, the keyboard controller again permits transfers of data from the keyboard and other peripheral input devices to the host computer.

In one embodiment, the preset interval of inactivity is alterable by the user. In addition, the password is alterable by the user. However, in order to prevent a virus from disabling the security or to prevent an unauthorized user from changing these parameters after an authorized user has initialized operation of the computer, these parameters are only alterable during setup operations. Setup operations are only accessible by initiating boot operations, during which the authorized password must be entered by the user. Once an authorized password is entered and initialization is complete, setup operations are no longer accessible, making it very difficult for an unauthorized user to alter the password or interval of inactivity parameters, or to disable security.

There are a number of advantages in providing security at the keyboard controller level rather than as a TSR at the host computer operating system level. For instance, the security system instructions executed by the keyboard controller are stored within a static memory for the keyboard controller and executed by the keyboard controller. The password is also stored in the static keyboard controller memory. Therefore, this memory is virtually inaccessible to external devices or to viruses after boot operations. Therefore, it becomes very difficult to disable the security without replacing the keyboard controller.

In addition, a TSR stored on a disk must be executed before it is effective. If the TSR originates from the same disk the user uses for other purposes, the user may have access to initialization files which include the security TSR. Therefore, the user may remove the security TSR. With the present invention, access to setup operations may, in one embodiment, be protected by a separate password so that security can be controlled by someone other than the user (e.g., a system administrator). This provides additional security by limiting those who can alter security parameters.

One aspect of the present invention involves a security system for a host computer. The security system operates independently of the host computer. When security measures are activated, access to an operating system of the host computer is disabled. The security system operates with at least one peripheral input device. The security system also comprises a microprocessor based peripheral device controller in communication with the host computer and the at least one peripheral input device. The peripheral device controller provides an interface between the at least one peripheral input device and the host computer. During operation, the peripheral device controller is responsive to the elapsing of a predetermined period during which the peripheral input device remains inactive. After the elapsing of the predetermined period, the peripheral device controller automatically inhibits access to the host computer. The peripheral device controller is further responsive to the entry of predesignated signals from the peripheral input device to permit access to the host computer after access has been inhibited.

In one embodiment, the host computer is in communication with a display, and the peripheral device controller is further responsive to the predetermined period during which the peripheral input device remains inactive to send signals to the host to deactivate the display so that information visible on the display is not viewable. In this embodiment, the peripheral input device is further responsive to the predesignated signals from the peripheral input device to restore operation of the display.

Another aspect of the present invention involves a computer security system for use with a host computer which utilizes a peripheral device controller as an interface between peripheral devices and the host computer. The host computer is in communication with the peripheral device controller, and the security system is controlled by the peripheral device controller independently of the operation of the host computer. The security system prevents access to an operating system of the host computer when security measures have been activated. The security system comprises at least one peripheral input device in communication with the peripheral device controller. The security system further comprises at least one polling block stored in a memory for the peripheral device controller and executable by the peripheral device controller. During execution of the polling block by the peripheral device controller, the peripheral device controller monitors a period of inactivity of the at least one peripheral input device and detects when the period of inactivity is equal to or greater than a predetermined period of inactivity. At least one security measures block is also stored in the memory for the peripheral device controller. The security measures block is executable by the peripheral device controller, and includes instructions which, during execution by the peripheral device controller, are responsive to the detection of the predetermined period of inactivity by the polling block to automatically disable access to the host computer through the peripheral device controller.

In one embodiment, the host computer is in communication with a display, and the security measures block further includes instructions executable by the peripheral device controller to cause the peripheral device controller to respond to the detection by the polling block, and in response, to send signals to the host to deactivate the display. The deactivation of the display may take the form of blanking the display, or of displaying data other than data visible on the display before the detection.

The computer security system further comprises an enable access block stored in the memory and executable by the peripheral device controller. The enable access block has instructions which, during execution, are responsive to the entry of predesignated data from the peripheral input device to enable access to the host computer. In an embodiment where the peripheral input device comprises a keyboard, the predesignated data may comprise a predefined password.

Yet another aspect of the present invention involves a method of preventing unauthorized access to a host computer wherein the host computer is in communication with a keyboard controller. The keyboard controller is in turn in communication with at least one peripheral input device. Preferably, the method is implemented in the keyboard controller such that it operates independently of the host computer. The keyboard controller executes the method to monitor input to the host from the peripheral input device. The method comprises a number of steps. The keyboard controller monitors the peripheral input device for inactivity, and detects when the peripheral input device has remained inactive for a predetermined period of inactivity. After detecting that the peripheral device has remained inactive for the predetermined period of inactivity, the keyboard controller prevents data from the peripheral input device from passing to the host computer through the keyboard controller.

After the keyboard controller prevents data from passing to the host computer, the keyboard controller monitors the peripheral input device to detect the receipt of data from the peripheral input device. The keyboard controller compares the data from the peripheral input device to prespecified data to detect when the data from the peripheral input device is equivalent to the prespecified data. When data from the peripheral input device is equivalent to the prespecified data, the keyboard controller again permits subsequent data from the peripheral input device to pass through the keyboard controller to the host computer.

In an embodiment where the peripheral input device comprises a keyboard and the prespecified data comprises a password, the keyboard controller monitors the keyboard for input data, ignores input data that is not the password, and detects when the input is the correct password.

In an embodiment where the host computer is further in communication with a display, the keyboard controller may deactivate the display after the predetermined period of inactivity by sending signals to the host computer which indicate to the host computer to blank the display.

Alternatively, when the host computer is in communication with a display, the keyboard controller may deactivate the display after the predetermined period of inactivity by initiating display of data other than data which was visible on the display before the predetermined period of inactivity.

BRIEF DESCRIPTION OF THE DRAWINGS

FIGS. 3a-3d depict a flow chart which details the method employed by the computer security system of the present invention.

DETAILED DESCRIPTION OF THE PREFERRED EMBODIMENTS

The present invention provides a security system for computers which utilizes a peripheral device controller, such as a conventional keyboard controller, as an interface between a host computer and a keyboard (and other input devices). The keyboard controller executes the security operations.

In many conventional computer systems, keyboard controllers are used to manage and process data from peripheral input devices such as a keyboard or a mouse. The data is typically transmitted to the host computer system by the keyboard controller. In other words, the keyboard controller acts as an interface between the input devices and the host computer. The majority of the communication between the keyboard controller and the host computer is unidirectional, with the keyboard controller transmitting scan codes representing keys pressed on the keyboard to the host. However, the host also requests data from the controller for the purpose of error checking, handshaking, checking the status of bits and other similar functions. In some cases the host is able to program the keyboard controller; however, keyboard controllers which are programmable by the host typically include a lockout feature which may be used to prevent access of the host to the keyboard controller program. Thus, a keyboard controller which is configured to provide computer security provides the significant advantage of not being as susceptible to access by the host system. This and other associated advantages will be related in detail with reference to FIGS. 1-4 below.

Figure 1:
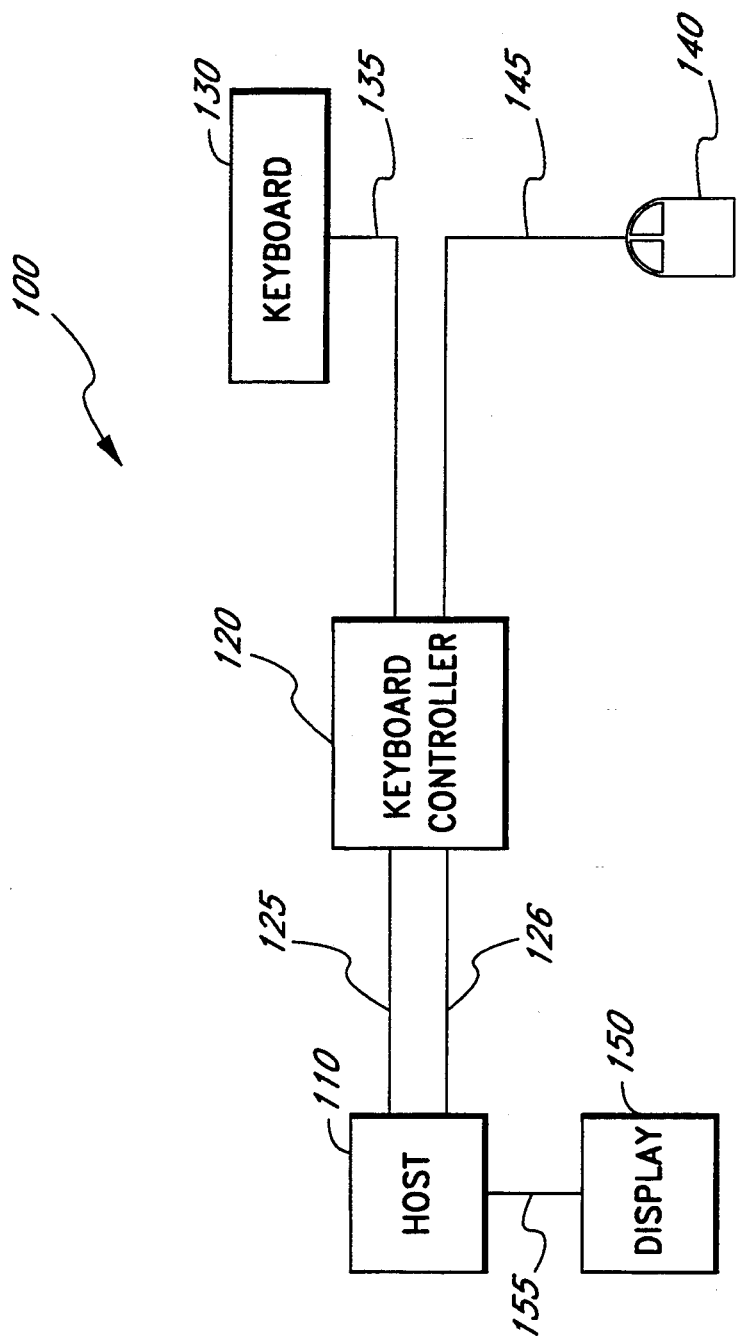
FIG. 1 is a schematic block diagram showing the major functional elements of a computer system.

FIG. 1 depicts a computer security system 100 comprising a host computer 110 which is in communication with a keyboard controller 120 via signal lines 125. In one embodiment, the keyboard controller 120 has a display blanking port which connects to the host via a signal line 126. The host computer 110 may, for instance, be an IBM PS/2 compatible computer. The signal lines 125 comprise an input/output bus between the host 110 and the keyboard controller 120. The keyboard controller 120 is in communication with a keyboard 130 via signal lines 135, and with a peripheral mouse 140 via signal lines 145. The keyboard controller 120 is advantageously a microprocessor based controller such as AST® Corporation's MIKI controller, or an INTEL® 80C51SL-AG, 8742, 8042, or similar microprocessor based keyboard controller. FIG. 1 further illustrates a display terminal 150 connected to the host 110 via signal lines 155. As is well known in the art, the keyboard controller 120 provides an interface between the host 110 and the peripheral input devices such as the keyboard 130 and mouse 140.

Figure 2:
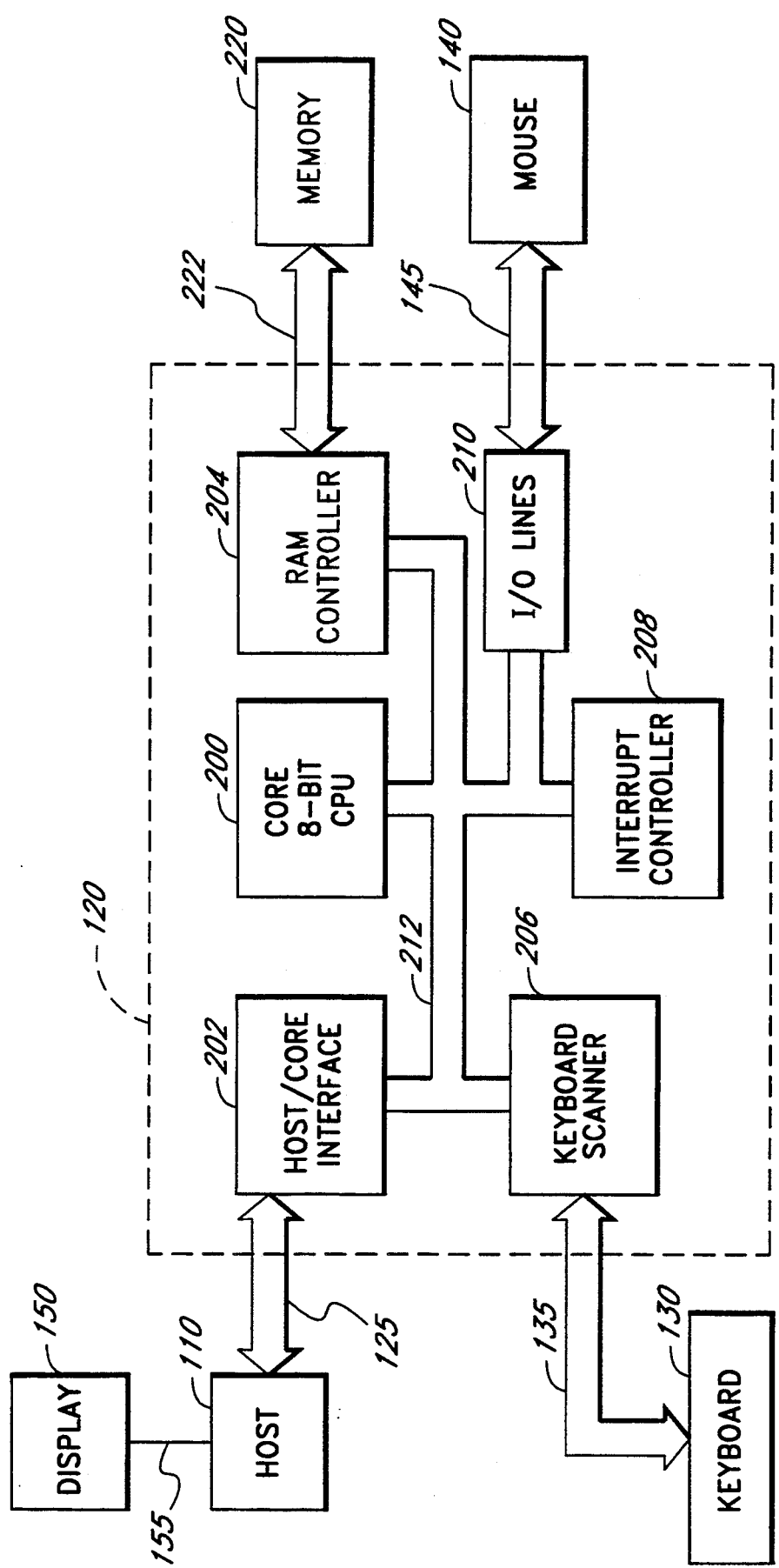
FIG. 2 is a schematic block diagram showing the major functional elements within the keyboard controller of FIG. 1.

FIG. 2 is a schematic block diagram depicting the major functional elements of the keyboard controller 120 in one embodiment of the computer security system. The keyboard controller 120 is connected via the input/output bus 125 to the host computer 110. The keyboard controller 120 is also connected to the keyboard 130 via the signal lines 135 and to one or more input/output peripheral devices, such as the mouse 140 via the signal lines 145. The keyboard controller 120 has a core central processing unit (CPU) 200 (e.g., typically an 8-bit CPU such as an INTEL® model 8031 or 8051 controller), a host/core interface 202, a Ram controller 204, a keyboard scanner 206, a local interrupt controller 208, and input/output lines 210. These elements are interconnected by means of an internal bus 212. The RAM controller 204 is further connected to a memory 220 (preferably, a static memory) via signal lines 222. Although the memory 220 is shown in FIG. 2 as being external to the keyboard controller 120, it should be understood that the memory 220 may also be internal to the keyboard controller 120.

In operation, the keyboard controller 120 performs a number of pre-programmed procedures which relate to the interaction between the host system 110 and the keyboard 130 and/or mouse 140. Typically, the memory 220 contains a series of instructions. The instructions may be downloaded from the host 110, or may be pre-programmed within the memory 220. In one embodiment, the keyboard controller 120 executes the instructions in response to an interrupt generated by the keyboard 130 or the mouse 140. The general method used by the keyboard controller 120 to provide security for access to the host 110 is described with reference to the flowcharts of FIG. 3 and FIG. 4.

The method depicted in the flowcharts of FIG. 3 may generally be divided into four main parts. The first portion is an introductory decision section which determines if only the mouse 140 is currently enabled, if only the keyboard 130 is currently enabled, if both the mouse 140 and keyboard 130 are enabled or if both the mouse 140 and the keyboard 130 are disabled. Once a determination has been made concerning which peripheral input devices are presently enabled, the method enters one of three polling subroutines, and the keyboard controller 120 polls the appropriate peripheral devices and the host 110 in order to determine if these devices are active (currently generating or transferring data to the keyboard controller 120).

The polling subroutine entered depends upon which peripheral devices are enabled. If the mouse 140 is not enabled, then the keyboard controller 120 enters a subroutine 304 and polls only the host 110 and possibly the keyboard 130. If only the mouse 140 is enabled, then the keyboard controller 120 enters a subroutine 308 and polls only the mouse 140 and host 110. Finally, if both the keyboard 130 and the mouse 140 are enabled, then the keyboard controller 120 enters a subroutine 310 and polls the keyboard 130, the mouse 140, and the host 110.

Each polling subroutine has a timing loop which monitors the amount of time that the enabled peripheral devices and the host 110 remain inactive. In general, when the enabled peripheral devices and the host 110 remain inactive for a pre-specified interval (the selected period of inactivity), the security system switches to an active security mode (activates security measures). In the present embodiment, the security measures comprise preventing the transmission of data from the peripheral devices to the host, inactivating (blanking) the display screen, or both preventing the transmission of data to the host and blanking the display screen.

Advantageously, the selection of the security measures and the selected period of inactivity are programmable by an authorized user during setup operations. As explained, setup operations are only accessible during computer boot operations immediately following entry of the correct password. In one embodiment, the present invention may be configured so that tile security system 100 activates the selected security measures after 30 seconds of inactivity, or multiples thereof, as selected by the user during setup operations.

As explained above, many keyboard controllers prevent access to the keyboard controller program memory by the host (known as lockout) except during setup operations. Lockout is typically activated during boot operations. As explained in further detail below, lockout adds integrity to the security system because the host will not be able to access the keyboard controller 120 to disable security once the lockout feature is active.

Finally, in one embodiment, the user may also select to disable the security system altogether during setup operations. When the user disables security, a flag is set in the keyboard controller to indicate that security is disabled. The setup operations will be described in greater detail below.

Figure 3B:
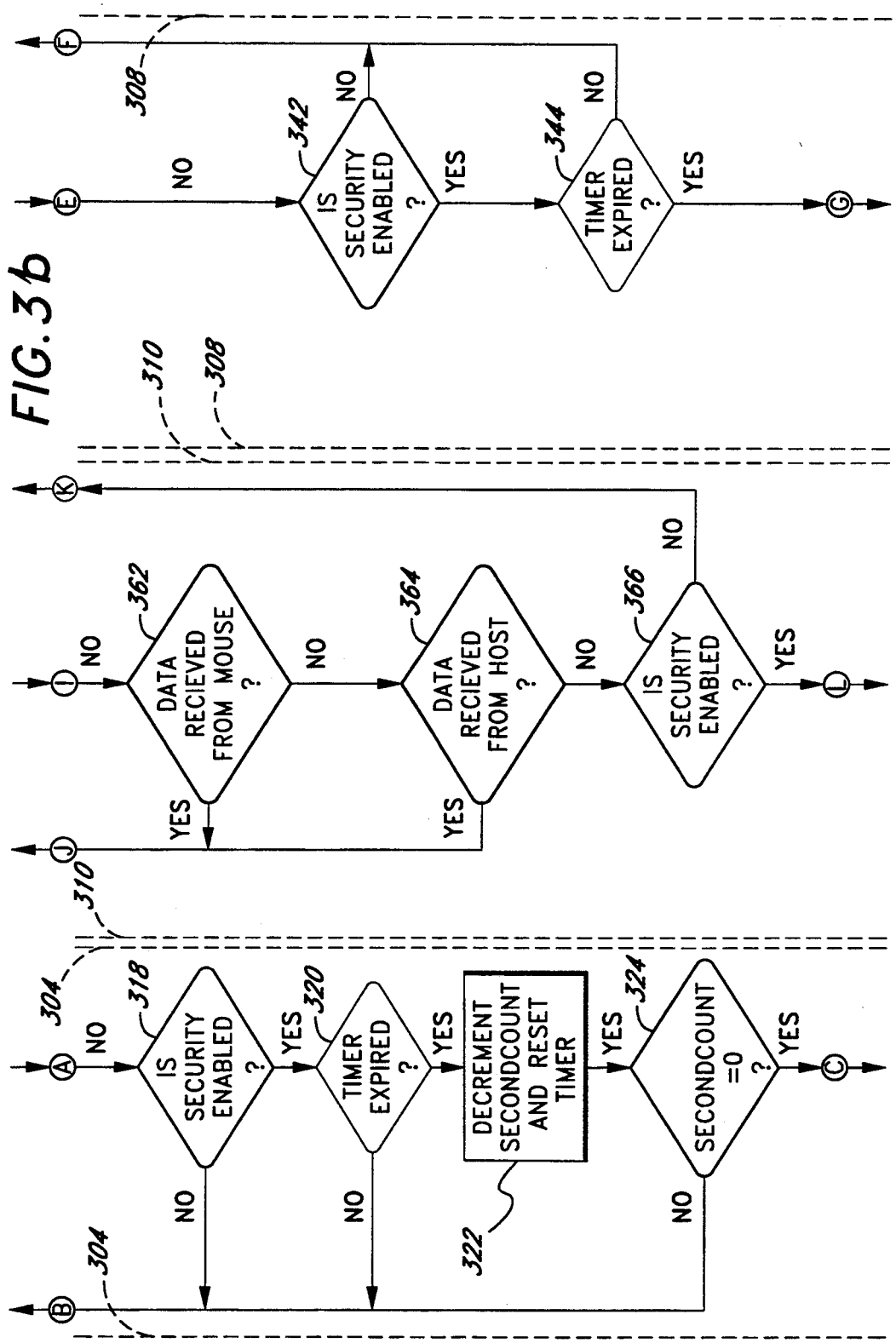
Figure 3C:
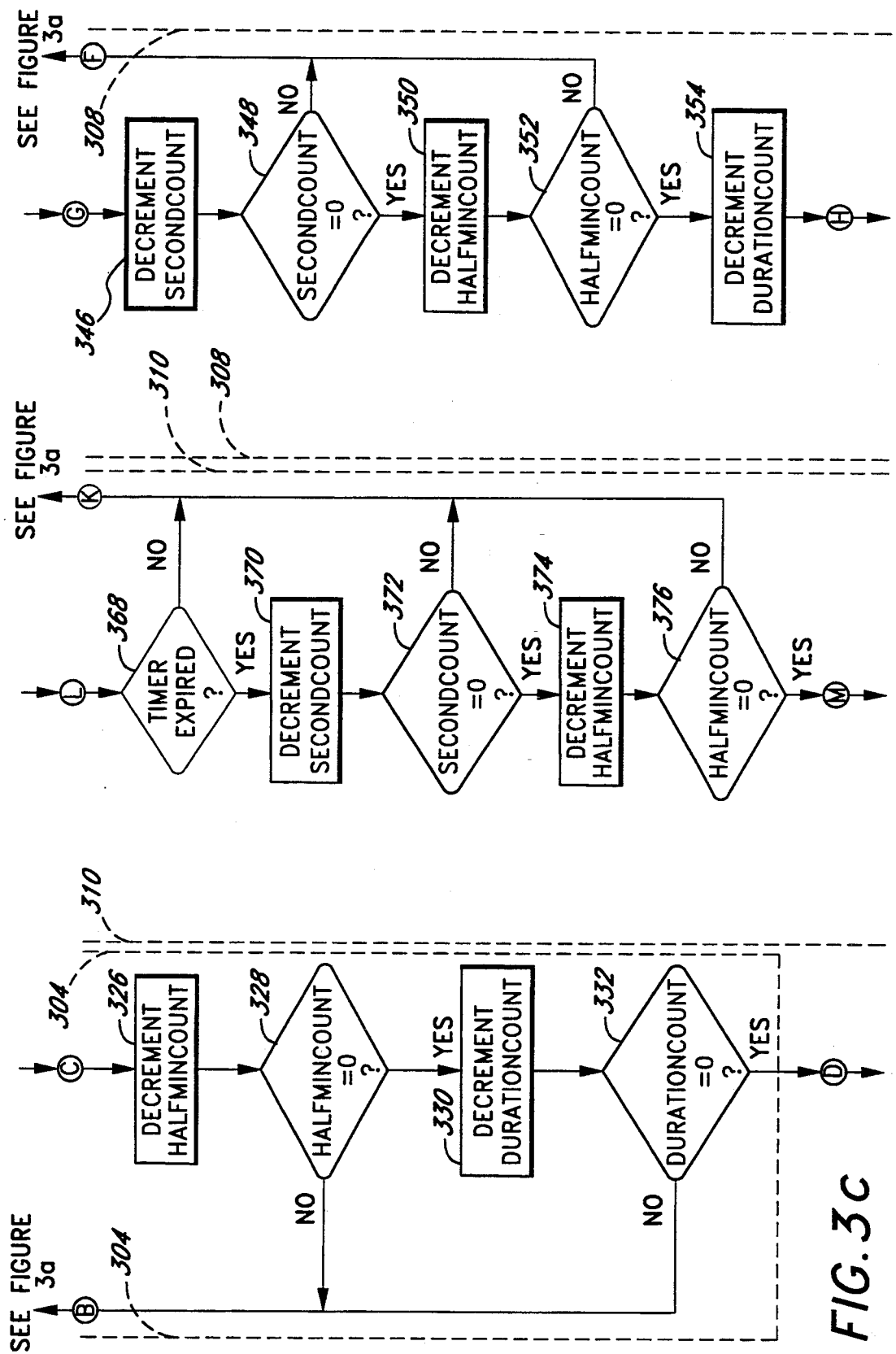
Figure 4:
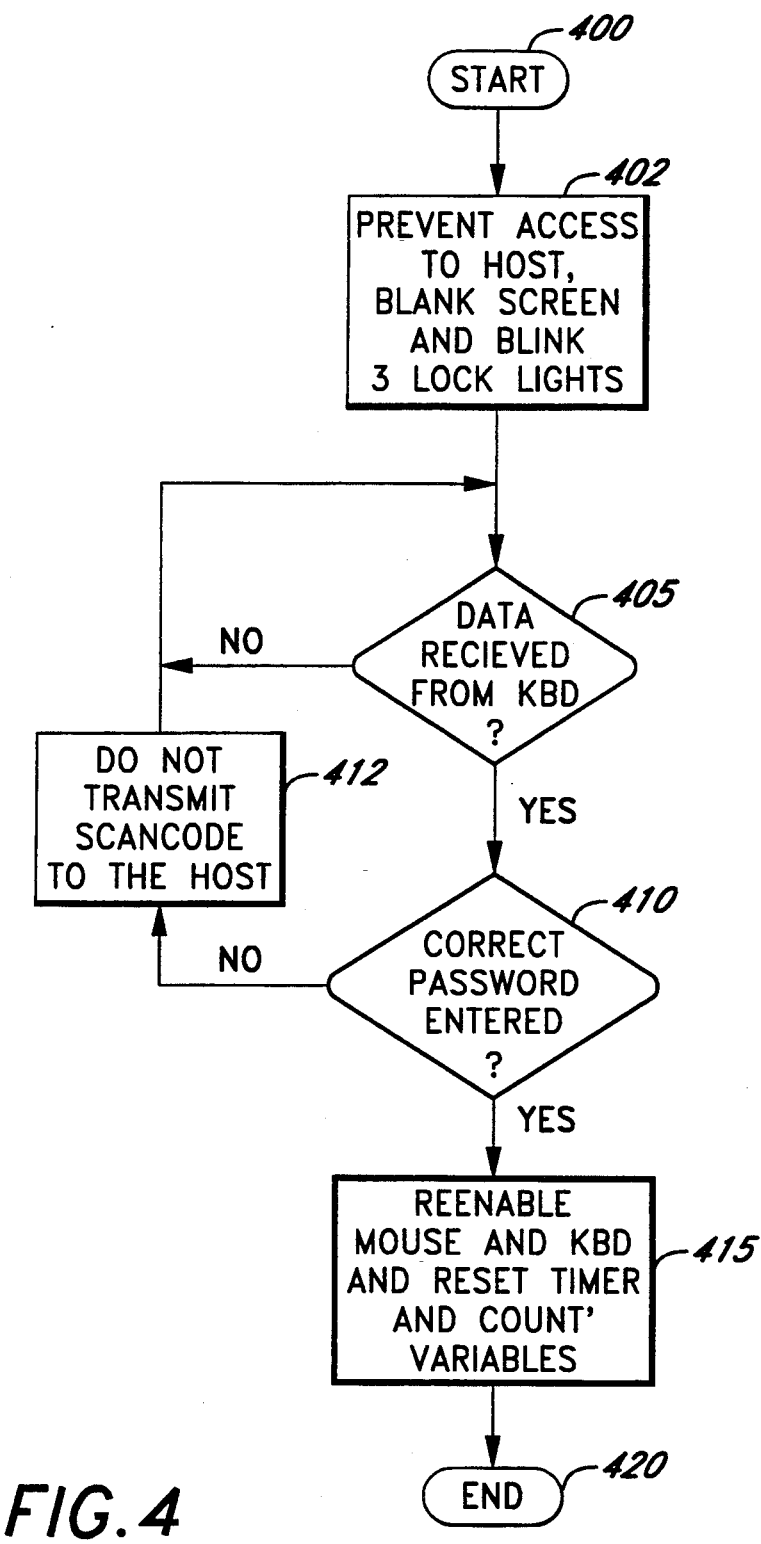
FIG. 4 depicts a flow chart which details the general method employed within the lockout subroutine block of FIG. 3d.

The flowcharts of FIG. 3 and FIG. 4 illustrate the method employed by the present invention to provide computer security. The security system instructions to carry out the operations illustrated in the flowcharts are stored in the memory 220 and executed by the keyboard controller 120, independent of the host operating system. From a start block 300, control passes to a decision block 302. At the decision block 302, the keyboard controller 120 determines if the mouse 140 is enabled. If the mouse 140 is not enabled, then control passes through a polling subroutine routine generally designated by the reference number 304. In the present embodiment, if the mouse 140 is not enabled, the keyboard controller 120 determines if the keyboard 130 is enabled in a decision block 309. If the keyboard 130 is not enabled, the keyboard controller 120 waits for data from the host 110. If the keyboard 130 is enabled, the keyboard controller 120 continuously monitors the activity of the keyboard 130 and the host 110, as explained in detail below.

However, if the mouse 140 is enabled (decision block 302), then control passes to a decision block 306, and the keyboard controller 120 determines if the keyboard 130 is enabled. If the keyboard 130 is not enabled, then control passes to a polling subroutine 308, and the keyboard controller 120 monitors the activity of the mouse 140 and the host 110. However, if the keyboard 130 is enabled, then control passes to a polling subroutine 310, and the keyboard controller 120 monitors the activity of the mouse 140, the keyboard 130, and the host 110.

The polling subroutine 304 monitors the period of inactivity of the keyboard 130 and the host 110 (the interval during which the keyboard 130 and the host 110 have remained inactive), whenever the keyboard controller 120 senses activity from either of these devices, it resets the variables which track the period of inactivity as explained in more detail below. In the polling subroutine 304 (the keyboard controller 120 determined at the decision block 302 that the mouse 140 was not enabled), control passes to a decision block 309, and the keyboard controller 120 determines whether the keyboard 130 is enabled.

If the keyboard 130 is not enabled, control passes to a decision block 311, and the keyboard controller 120 determines if data has been received from the host 110. Control remains at the decision block 311 until data is received from the host 110. In other words, when neither the mouse 140 interface nor the keyboard 130 interface is enabled, the keyboard controller 120 only polls input from the host 110. If the keyboard controller 120 receives data from the host 110, control passes from the decision block 311 to the action block 314.

If at the decision block 309, the keyboard controller 120 determines that the keyboard 120 interface is enabled, control passes to a decision block 312, and the keyboard controller 120 determines whether data has been received from the keyboard 130. The receipt of data from the keyboard (KBD) 130 indicates that the computer system should remain active (security measures inactive) because the user is entering data with the keyboard 130. Accordingly, a fresh timing cycle is initialized.

To initiate a new timing cycle, control passes to a process block 314, and the keyboard controller 120 resets an internal timer (a conventional watchdog timer) and additional "count" variables. The internal timer typically is a counter which increments once every clock cycle. In most conventional computer systems, the internal watchdog timer reaches its maximum count value in less than one second, which is less than the minimum selected period of inactivity (interval of inactivity before the keyboard controller initiates security measures) which can be specified by the user during setup. For instance, a typical watchdog timer may count 50 millisecond intervals whereas the selected period of inactivity may be several seconds or minutes. If the user selects to activate the security measures of the system 100 after the host 110, the keyboard 130 and the mouse 140 have been inactive for longer than the watchdog time interval (e.g., for 30 seconds), one or more count variables are employed in accordance with the present invention to account for time intervals greater than that accounted for by the internal timer. The present embodiment of the security system utilizes count variables to monitor the period during which the peripheral devices and the host 110 remain inactive. In one embodiment, if the internal timer resets every 50 milliseconds, the security system of the present invention uses three variables: SECONDCOUNT (to monitor seconds), HALFMINCOUNT (to monitor 30-second intervals), and DURATIONCOUNT (to monitor the number of 30-second intervals which have elapsed). The internal timer and the variables SECONDCOUNT, HALFMINCOUNT, and DURATIONCOUNT are used in the polling subroutines 304, 308, and 310, and their functions will be described in greater detail below.

Once the timer and the three variables SECONDCOUNT, HALFMINCOUNT, and DURATIONCOUNT, have been reset (process block 314), control passes again to the beginning of the routine (decision block 302), as illustrated in the flowchart of FIG. 3a.

If the keyboard controller 120 determines that data has not been received from the keyboard 130 (decision block 312), then control passes to a decision block 316. At the decision block 316, the keyboard controller 120 determines if data has been received from the host 110. As explained above, if either the host or the keyboard are active, then the keyboard controller 120 resets the variables which monitor the period of inactivity which has elapsed. Therefore, the receipt of data from the host 110 indicates that the system 100 is active and control passes to the process block 314, and the keyboard controller 120 resets the count variables (i.e., SECONDCOUNT, HALFMINCOUNT, and DURATIONCOUNT). If, however, the keyboard controller 120 determines at the decision block 316 that data has not been received from host 110, then neither the keyboard 130 nor the host 110 are active, and control passes to a decision block 318 (FIG. 3b) via a continuation point A.

In the decision block 318 (FIG. 3b), the keyboard controller 120 determines whether the security system is enabled. The security system is enabled anytime passwords are enabled in the setup operations. In the present embodiment, the security system sets a flag indicating that passwords are enabled. The keyboard controller 120 can more quickly access the flag during operation than it can determine whether passwords are enabled. If the security system is not enabled, then the security measures should not be activated, regardless of the period of inactivity. Therefore, control passes from the decision block 318 to the beginning of the routine (FIG. 3a) via a continuation point B.

If, however, the security system is enabled, then control passes to a decision block 320, and the keyboard controller 120 determines if the system internal timer (e.g., the 50 millisecond timer) has expired. If the timer has not expired, then control passes to the beginning of the routine (FIG. 3a) via the continuation point B. However, if the timer has expired, control passes to a process block 322, and the variable SECONDCOUNT is decremented and the timer is reset. The variable SECONDCOUNT measures the amount of time (during which no activity is detected) tracked by the security system in intervals of one second. In particular, the value of SECONDCOUNT is such that the maximum value of SECONDCOUNT multiplied by the period accounted for by the internal timer is equal to one second. For example, if the time which elapses before a reset of the internal timer is 50 milliseconds, the maximum value of the variable SECONDCOUNT should be 20. The variable SECONDCOUNT is decremented each time that the watchdog timer expires, so that when the value of SECONDCOUNT is decremented to zero, this indicates that 20 intervals of 50 milliseconds have lapsed. Therefore, the value of SECONDCOUNT is decremented to zero every second.

Control passes from the process block 322 to a decision block 324. At the decision block 324, the keyboard controller 120 determines whether the value of the variable SECONDCOUNT is equal to zero. If the value of the variable SECONDCOUNT is not equal to zero, one full second has not elapsed since SECONDCOUNT was reset, and control passes to the beginning of the routine via the continuation point B. If, however, the value of the variable SECONDCOUNT equals zero, one full second has elapsed since SECONDCOUNT was last reset, and control passes to a control block 326 (FIG. 3c) through a continuation point C.

At the process block 326, the keyboard controller 120 decrements HALFMINCOUNT and resets SECONDCOUNT and the internal timer. The variable HALFMINCOUNT is used by the system to account for periods of 30 seconds. The maximum value of the variable HALFMINCOUNT is advantageously 30 since the variable HALFMINCOUNT is decremented every full second (i.e., each time the variable SECONDCOUNT is decremented to zero). Thus, the variable HALFMINCOUNT is decremented to zero after 30, one-second intervals of inactivity.

Control passes from the process block 326 to a decision block 328, and the keyboard controller 120 determines whether the variable HALFMINCOUNT equals zero. If the variable HALFMINCOUNT does not equal zero, then this indicates that 30 seconds have not elapsed since HALFMINCOUNT was last reset to its maximum value, and control passes to the beginning of the routine (FIG. 3a) via the continuation point B. However, if the variable HALFMINCOUNT equals zero (decision block 328), 30 seconds have elapsed since HALFMINCOUNT was last reset, and control passes from the decision block 328 to a process block 330.

At the process block 330, the keyboard controller 120 decrements the value of the variable DURATIONCOUNT, and resets the values of the variables SECONDCOUNT and HALFMINCOUNT and resets the internal timer. The variable DURATIONCOUNT is used by the security system to account for the selected period of inactivity set by the user at setup, or set by the operating system during boot operations. For example, if during setup operations, the user sets the selected period of inactivity (before which the security system activates the security measures) to one and one-half minutes, then the value of DURATIONCOUNT will be set to three, so that three, half-minute intervals will expire before the value of the variable DURATIONCOUNT is decremented to zero.

Control passes from the process block 330 to a decision block 332, and the keyboard controller 120 determines whether the value of the variable DURATIONCOUNT equals zero. If the value of the variable DURATIONCOUNT does not equal zero, the selected period of inactivity set by the user or the operating system has not yet expired, and the security measures are not initiated. However, if the value of the variable DURATIONCOUNT equals zero, the selected period of inactivity has expired, and control passes to a subroutine block 334 (FIG. 3d) via a continuation point D. At the subroutine block 334, the computer security system activates the security measures (e.g., the peripheral input devices are prevented from accessing the computer operating system and the display may be disabled). The method represented by the subroutine block 334 is described in greater detail with reference to FIG. 4 below.

If, at the beginning of the entire routine (FIG. 3a), it is determined that the mouse 140 is enabled (decision block 302) and the keyboard 130 is not enabled (decision block 306), then control passes from the decision block 306 to a decision block 336 (of the polling subroutine 308). The polling subroutine 308 monitors the period of inactivity when only a mouse is currently enabled as a peripheral input device.

At the decision block 336, the keyboard controller 120 determines whether data has been received from the mouse 140. If data has been received from the mouse 140, then control passes to a process block 338, and the watchdog timer and the respective count variables (i.e., SECONDCOUNT, HALFMINCOUNT, and DURATIONCOUNT) are reset. This is because the mouse 140 is active, and the elapsed period of inactivity should be reset. If data is not received from the mouse 140, then control passes from the decision block 336 to a decision block 340, and the keyboard controller 120 determines whether data has been received from the host 110. If data has been received from the host 110, then control passes to the process block 338 where the watchdog timer and count variables are reset. However, if data has not been received from host 110 (decision block 340), the system is inactive (data has not been received from the mouse 140 or the host 110) and control passes from the decision block 340 to a decision block 342 (FIG. 3b) via a continuation point E.

At the decision block 342, the keyboard controller 120 determines whether the security system is enabled. If the security mode of the system 100 is not enabled, then control returns to the beginning of the routine (FIG. 3a) via a continuation point F. If the security system is enabled (e.g., by the user at setup or by the system during boot operations), then control passes from the decision block 342 to a decision block 344, and a determination is made if the internal timer has expired (reached zero).

If the internal timer has not expired, control returns to the beginning of the routine (FIG. 3a) through the continuation point F. If the timer has expired, then control passes to a process block 346 (FIG. 3c) via a continuation point G, and the keyboard controller 120 decrements the variable SECONDCOUNT and resets the internal timer. Control then passes to a decision block 348.

At the decision block 348, the keyboard controller 120 determines whether the value of the variable SECONDCOUNT equals zero. If SECONDCOUNT does not equal zero, control passes to the beginning of the routine (FIG. 3a) via the continuation point F. If the value of the variable SECONDCOUNT equals zero, control passes to a process block 350. At the process block 350, the keyboard controller 120 decrements the variable HALFMINCOUNT, and resets the variable SECONDCOUNT and the internal timer.

Control then passes to a decision block 352, and the keyboard controller 120 determines whether the value of the variable HALFMINCOLINT equals zero. If the variable HALFMINCOUNT does not equal zero, 30 seconds have not yet elapsed since HALFMINCOUNT was last reset, and control passes to the beginning of the routine (FIG. 3a) via the continuation point F. However, if the value of the variable HALFMINCOUNT equals zero (decision block 352), control passes to a decision block 354, and the keyboard controller 120 decrements the variable DURATIONCOUNT, and resets the variables HALFMINCOUNT and SECONDCOUNT and resets the internal timer.

Control then passes to a decision block 356 (FIG. 3d) through a continuation point H, and the keyboard controller 120 determines whether the value of the variable DURATIONCOUNT equals zero. If the value of the variable DURATIONCOUNT does not equal zero, then control passes to the beginning of the routine (FIG. 3a) through the continuation point F. If, however, the value of the variable DURATIONCOUNT equals zero, then this indicates that the pre-specified time period of inactivity before activating the computer security measures has expired. Control passes to the subroutine block 334, and the security system activates the security measures.

If, at the beginning of the routine (FIG. 3a), it is determined that the mouse 140 and the keyboard 130 are both enabled (decision blocks 302 and 306), control passes from the decision block 306 to a decision block 358 (in the polling subroutine 310). The polling subroutine 310 monitors the period of inactivity for configurations when both the mouse 140 and the keyboard 130 are enabled.

At the decision block 358, the keyboard controller 120 determines if data has been received from the keyboard 130. If data has been received from the keyboard 130, then control passes to a process block 360, and the internal timer and each of the count variables are reset. If, however, data has not been received from the keyboard 130, then control passes to a decision block 362 (FIG. 3b) through a continuation point I, and the keyboard controller 120 determines whether data has been received from the mouse 140. If data has been received from the mouse 140, then control passes to the process block 360 (FIG. 3a) through the continuation point J, and the keyboard controller 120 resets the count variables and the internal timer. However, if data has not been received from the mouse 140, then control passes to a decision block 364 (FIG. 3b).

At the decision block 364, the keyboard controller 120 determines whether data has been received from the host 110. If data has been received from the host 110, then control passes to the process block 360 (FIG. 3a) through the continuation point J, and the keyboard controller 120 resets the internal timer and the count variables. However, if data has not been received from the host 110 (decision block 364), then this indicates that the keyboard 130, mouse 140 and host 110 are inactive with respect to the keyboard controller 120, and control passes to a decision block 366.

At the decision block 366, the keyboard controller 120 determines if the security system is enabled. If the security is not enabled, then control returns to the beginning of the routine (FIG. 3a) through a continuation point K. However, if the security is enabled, then control passes to a decision block 368 (FIG. 3c) through a continuation point L. At the decision block 368, the keyboard controller determines if the watchdog timer has expired. If the timer has not expired, control returns to the beginning of the routine (FIG. 3a) through the continuation point K. However, if the timer has expired, then control passes to a process block 370.

At the process block 370, the keyboard controller 120 decrements SECONDCOUNT and resets the internal timer. Control then passes to a decision block 372, and the keyboard controller 120 determines whether the variable SECONDCOUNT equals zero. If the variable SECONDCOUNT does not equal zero, then control passes to the beginning of the routine (FIG. 3a) through the continuation point K; however, if the variable SECONDCOUNT equals zero, then control passes to a process block 374, and the variable HALFMINCOUNT is decremented, and the variable SECONDCOUNT and the internal timer are reset. Control then passes from the process block 374 to a decision block 376.

At the decision block 376, the keyboard controller 120 determines whether the value of the variable HALFMINCOUNT has been decremented to zero. If the value of the variable HALFMINCOUNT does not equal zero, then control returns to the beginning of the routine (FIG. 3a) through the continuation point K; however, if the value of the variable HALFMINCOUNT equals zero, then control passes to a process block 378 (FIG. 3d) through a continuation point M.

At the process block 378, the keyboard controller 120 decrements the DURATIONCOUNT variable, and resets the HALFMINCOUNT and SECONDCOUNT variables and the internal timer. Control then passes to a decision block 380, and the keyboard controller determines whether the value of the DURATIONCOUNT variable equals zero. If the value of the DURATIONCOUNT variable does not equal zero, control returns to the beginning of the routine (FIG. 3a) through the continuation point K. If the value of the variable DURATIONCOUNT equals zero, then control passes to the subroutine block 334 and security measures are activated (e.g., the peripheral input devices are prevented from accessing the operating system of the host 110).

The functions represented with the subroutine block 334 are described in greater detail with reference to the flow chart of FIG. 4. The flow chart of FIG. 4 begins at a start block 400. At a process block 402, the keyboard controller 120 prevents access to the host 110 from the peripheral input devices and disables the display 150 (e.g., the display is blanked). The display 150 may be blanked by means of a signal transmitted from a special blanking port which may be incorporated within the keyboard controller (e.g., the MIKI controller from AST® includes a special blanking port connected to the host via the signal line 126), or a routine within the keyboard controller 120 may be configured to issue a blanking scan code command to the host 110 (e.g., in Cruise Control Version 3.02 the [5] [Del] keystroke sequence blanks the screen, as well known in the art). It should be noted, however, that the blanking of the terminal display screen 150 is an optional function of the system 100, and the security mode may be activated without blanking the display screen 150. As a further example, a unique pattern may be displayed on the screen to indicate that the security system is in effect.

Another optional function of the security system 100 which may be implemented within the process block 402 is the activation of the NUM LOCK, CAPS LOCK and SCROLL LOCK keyboard indicators (e.g., lights) when the system security measures are active. In one embodiment, the three lights blink simultaneously to indicate to the user that the system security measures are active.

Control then passes to a decision block 405, and the keyboard controller 120 determines whether data has been received from the keyboard (KBD) 130. Even though the keyboard may have been temporarily disabled, as determined in the decision block 306, the keyboard controller 120 will now monitor the keyboard for input. If data has not been received from the keyboard 130, then the keyboard controller 120 waits at the decision block 405 for keyboard input. If data has been received from the keyboard 130, then control passes to a decision block 410, and the keyboard controller 120 determines whether the data which was received is the correct password. In order to determine whether the data entered is the correct password, the keyboard controller 120 compares the data from the keyboard to the correct password stored in the keyboard controller's memory. The keyboard controller 120 need not access the operating system of the host 110 in order to make the password determination. Accordingly, the security measures avoid any access to the host 110 by the keyboard controller 120 until the keyboard controller 120 detects entry of the correct password.

If the correct password has not been entered, then the security measures remain active, and the scan code representing each key pressed on the keyboard which is normally transmitted to the host 110 is not transmitted to the host 110 and is discarded, as represented in a process block 412. Accordingly, once the security measures have been activated, data is not forwarded to the host 110 from the keyboard controller 120 unless the correct password is entered. Control subsequently returns to the decision block 405.

Notably, in the present embodiment, the password can be between one and 8 characters, each of which has 46 possible values. Trying all permutations at one attempt per second would take several hundred thousand years. Accordingly, guessing becomes infeasible.

If the correct password is entered (determined at the decision block 410), control passes to a process block 415, the mouse 140 and/or the keyboard 130 are re-enabled, and the internal timer and the values of the count variables are reset. The screen 150 is also activated so that the entire system 100 becomes active. The routine then terminates in an end block 420. It should be noted that after the system reaches the end 420, the entire routine is reinitiated, starting at the start block 300 of FIG. 3a.

In one embodiment of the present invention, in addition to the automatic activation of security measures after the selected interval of inactivity has elapsed, the user may activate the security measures with a key sequence. In the present embodiment, the key sequence is selected as [Ctrl] [Alt] [Scroll Lock]. Accordingly, the user can activate the security measures at any time by pressing the appropriate key sequence. In an embodiment where this feature is implemented, the keyboard controller 120 merely checks for the selected key sequence each time through the polling routines 304, 308, and 310.

In order to set certain security parameters within the system 100, the user enters the system setup routine wherein a number of system parameters may be designated. One typical way to access the setup routine is by pressing designated keystroke sequences (e.g., [Ctrl] [Alt] [Esc]) immediately after entering the correct password during operating system boot operations of the host. As noted above, in one embodiment, the password controlling access to setup operations may be separate from the password controlling access to operating system operation. When the setup routine is entered, a list of options is presented to the user on the display 150. In the setup routine, the user may set security parameters such as (1) the selected interval of inactivity (i.e., the time delay which is desired before the security measures are activated), (2) whether or not passwords are enabled, (3) whether or not the terminal display 150 should be blanked when the security is active, and (4) the password. These parameters, when set, are stored in the keyboard controller memory during the setup operations. Preferably, the keyboard controller memory into which these parameters are stored is static, as is well understood in the art.

The present invention also incorporates a security parameter modification lockout feature which causes the keyboard controller 120 to ignore any security parameter modifications after the initial parameters have been set during setup operations performed during boot operations. Once setup operations are complete, and the lockout feature is active, the host 110 can no longer access the security parameters in the keyboard controller 120. Accordingly, a virus, or the like, cannot access the parameters to disable security or change other parameters.

In the present embodiment, if the user wishes to modify any of the security parameters, the user re-boots the system, enters the correct password and enters the setup operations. Otherwise, any changes to security parameters are ignored. This prevents an unauthorized user from changing the security parameters while the computer system is operating after a user has already entered the correct password. Thus, the security system of the present invention permits access to the security parameters only by authorized users.

A computer security system constructed in accordance with the teachings of the invention described above offers several advantages. Notably, because the system security executes within the keyboard controller 120, the security system of the present invention is independent from the host operating system. Therefore, the security system of the present invention offers greater protection against computer viruses. Furthermore, in accordance with the present invention, no operating routine needs to be installed by means of software on the host 110 because the security system instructions are always stored in the keyboard controller memory 220. Thus, the security routine does not conflict with other application programs.

The present invention may be embodied in other specific forms without departing from its spirit or essential characteristics. For example, the computer security system may simply blank the terminal screen 150 without intercepting the non-password data from the keyboard 130. Also, the computer security system may disable other peripheral devices which are connected to the host 110 by means of the keyboard controller input ports. Thus, the described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A security system for a computer, said security system operating independently of a host computer to disable access to an operating system of the host computer when security measures are activated, said security system comprising:
   at least one peripheral input device; and
   a microprocessor based peripheral device controller in communication with said host computer and said at least one peripheral input device, said peripheral device controller providing an interface between said at least one peripheral input device and said host computer, said peripheral device controller, independent of said host computer, responsive to the elapsing of a predetermined period during which said at least one peripheral input device remains inactive to automatically inhibit access to said host computer after said predetermined period has elapsed, said peripheral device controller further responsive to entry of predesignated signals from said at least one peripheral input device to permit access to said host computer.

2. The security system of claim 1, wherein said host computer is in communication with a display, said peripheral device controller further responsive to said predetermined period during which said at least one peripheral input device remains inactive to send signals to said host to deactivate said display so that information visible on said display is not viewable, said at least one peripheral input device further responsive to said predesignated signals from said peripheral input device to restore operation of said display.

3. A computer security system for use with a host computer, the security system operating independently of said host computer to prevent access to an operating system of the host computer when security has been activated, said security system comprising:
   at least one peripheral input device; and
   a peripheral controller in communication with said at least one peripheral input device and with said host computer, said peripheral controller providing an interface between said peripheral input device and the host computer, said peripheral controller, independent of said host computer, responsive to the elapsing of a predetermined period of inactivity during which said at least one peripheral input device remains inactive, and during which said host does not request data from said peripheral controller, to automatically disable access to said host computer through said peripheral controller after said predetermined period of inactivity has elapsed.

4. The computer security system of claim 3, wherein said host computer is in communication with a display, said peripheral controller further responsive to the elapsing of said predetermined period of inactivity to send signals to said host to deactivate said display.

5. A computer security system for use with a host computer which utilizes a peripheral device controller as an interface between peripheral devices and the host computer, said host computer in communication with said peripheral device controller, the security system controlled by the peripheral device controller independent of the operation of the host computer, the security system preventing access to an operating system of the host computer when security measures have been activated, said security system comprising:
   at least one peripheral input device in communication with said peripheral device controller;
   at least one polling block stored in a memory for said peripheral device controller and executable by said peripheral device controller, said polling block, during execution, monitoring a period of inactivity of said at least one peripheral input device and detecting when said period of inactivity is equal to or greater than a predetermined period of inactivity; and
   at least one security measures block stored in said memory for said peripheral device controller, said security measures block executable by said peripheral device controller, said security measures block, during execution, responsive to the detection by said polling block to automatically disable access to said host computer through said keyboard controller.

6. The computer security system of claim 5, wherein said host computer is in communication with a display, said security measures block further responsive to the detection by said polling block to send signals to said host to deactivate said display.

7. The computer security system of claim 6, wherein said security measures block comprises instructions to which said peripheral device controller responds to cause said host to deactivate said display by blanking said display.

8. The computer security system of claim 6, wherein the security measures block deactivates said display by displaying data other than data visible on said display before said detection.

9. The computer security system if claim 5, further comprising a enable access block stored in said memory and executable by said peripheral device controller, said enable access block, during execution, responsive to the entry of predesignated data from said peripheral input device to enable access to said host computer.

10. The computer security system of claim 9, wherein said peripheral input device comprises a keyboard and said predesignated data comprises a predefined password.

11. A method of preventing unauthorized access to a host computer, the host computer in communication with a keyboard controller, the keyboard controller further in communication with at least one peripheral input device, said method implemented in said keyboard controller independent of said host computer, said keyboard controller executing said method to monitor input to said host from said peripheral input device, said method comprising the steps of:

monitoring said peripheral input device with said keyboard controller for inactivity;

detecting with said peripheral controller when said peripheral input device has remained inactive for a predetermined period of inactivity; and after detecting that said peripheral device has remained inactive for said predetermined period of inactivity, preventing data from said peripheral input device from passing to said host computer through the keyboard controller.

12. The method of claim 11, further comprising the steps of:

monitoring said peripheral input device with said keyboard controller to detect the receipt of data from said peripheral input device;

comparing data from said peripheral input device to prespecified data to detect when said data from said peripheral input device is equivalent to said prespecified data; and when data from said peripheral input device is equivalent to said prespecified data, permitting subsequent data from said peripheral input device to pass through said keyboard controller to said host computer.

13. The method of claim 12, wherein said peripheral input device comprises a keyboard and said prespecified data comprises a password, said steps of monitoring and comparing comprising the steps of:

monitoring said keyboard for input data with said keyboard controller;

ignoring input data that is not said password; and detecting when said input is said correct password.

14. The method of claim 11, wherein said host computer is further in communication with a display, said method further comprising the step of indicating to said host to deactivate said display after said predetermined period of inactivity by blanking said display.

15. The method of claim 11, wherein said host computer is further in communication with a display, said method further comprising the step of, when data is visible on said display, deactivating said display after said predetermined period of inactivity by initiating display of data other than data which was visible on said display before said predetermined period of inactivity.

16. A security system for a computer comprising:

a host computer having a main central processing unit and associated circuitry;

a peripheral device interface coupled to said main host computer and coupled to at least one peripheral device, said peripheral device interface providing an interface between said host and said at least one peripheral device;

a memory coupled to said peripheral device interface and accessible by said peripheral device interface for execution of instructions stored in said memory, said memory generally inaccessible to said host computer;

a period of inactivity detection module stored in said memory for execution by said peripheral device interface, said period of inactivity detection module configured to, during execution, monitor said at least one peripheral device for inactivity and monitor said host for lack of communication directed to said peripheral device interface; and a disable access module stored in said memory for execution by said peripheral device interface, said disable access module responsive to the detection of the predetermined period of time of inactivity of said peripheral device and to the detection of lack of communication directed from said host to said peripheral device interface to disable access to said host computer by said peripheral device.

17. The security system of claim 16, wherein said peripheral device comprises a keyboard, further comprising a password monitor module stored in said memory for execution by said peripheral device interface, said password monitor module configured to monitor said peripheral device for entry of a predefined password and to allow access to said host computer by said keyboard upon entry of said predefined password.

18. The security system of claim 16, wherein said memory is further generally inaccessible said peripheral device.

* * * * *